United States Patent

[11] 3,616,359

| [72] | Inventors | John E. Paustian<br>Whippany;<br>Herman Burwasser, Vestal, both of N.Y. |
|---|---|---|
| [21] | Appl. No. | 753,863 |
| [22] | Filed | Aug. 20, 1968 |
| [45] | Patented | Oct. 26, 1971 |
| [73] | Assignee | Thiokol Chemcial Corporation<br>Bristol, Pa. |

[54] PROCESS FOR PREPARING NITROSO HALOCARBONS
2 Claims, No Drawings

| [52] | U.S. Cl. | 204/158 R |
|---|---|---|
| [51] | Int. Cl. | B01j 1/10 |
| [50] | Field of Search | 204/158, 162 |

[56] References Cited
UNITED STATES PATENTS

| 3,083,237 | 3/1963 | Haszeldine | 204/158 |
|---|---|---|---|
| 3,336,389 | 8/1967 | Blackley | 204/158 |

*Primary Examiner*—Howard S. Williams
*Attorney*—Curtis, Morris and Safford

ABSTRACT: A process has been provided for preparing perhalo nitroso alkanes from a halocarbon compound of the formula $RCX_2H$ wherein X is fluorine, chlorine, or bromine and R is a halogen or a perhalo radical and wherein the halogens substituents are fluorine, chlorine, or bromine. The process is carried out by reacting the halocarbon with nitrosyl chloride in a vapor phase at a pressure of one atmosphere or less and at a temperature from 160° C. and lower while irradiating the reaction mixture with radiant energy at the characteristic wavelength displayed by nitrosyl chloride.

PROCESS FOR PREPARING NITROSO HALOCARBONS

This invention relates to the preparation of nitroso halocarbons useful as intermediates for the preparation of nitroso polymers.

In particular, this invention relates to the preparation of trihalonitrosomethane, specifically trifluoronitrosomethane, which can be polymerized with other comonomers such as tetrafluoroethylene to form highly inert nitroso polymers. These nitroso polymers are cross-linked to form nitroso rubbers.

In recent years, nitroso rubbers have been a subject of considerable interest, being suitable materials for various applications demanding inertness, or more specifically, oxidation inertness.

Various forms of nitroso rubbers are existent; and in general, these rubbers and the polymer precursor are characterized by very low glass transition temperatures, resistance to solvent and chemical attack and, especially, resistance to aggressive liquid and gaseous oxidizers.

Based on the chemical structure of the polymer, the chemical inertness of it may range up to complete nonflammability in oxygen atmosphere. Hence, nitroso rubbers are especially useful in applications in which the rubber is exposed to a very corrosive atmosphere. Thus, gaskets, seals, O-rings and bladders for liquid oxidizers are but a few of the uses for nitroso rubbers.

Despite these advantageous properties and potential uses, rapid expansion in utilizing the nitroso polymers or rubbers has not taken place for various reasons. One of the problems has been a lack of economically viable processes for producing the necessary intermediates. Another problem has been the lack of economically attractive starting materials for preparing these intermediates. Moreover, the present day processes for preparing these intermediates are based on multistep sequences in which the yields per step decrease, often drastically.

Of the nitrosohaloalkanes used as precursors in forming the nitroso polymers, trifluoronitrosomethane is the most desired and widely utilized intermediate. This intermediate has been prepared by a variety of processes. Although a number of alternative processes are available for obtaining this intermediate, many of these processes are fraught with problems. Thus, a conventional process for preparing trifluoronitrosomethane is by reacting a 50/50 mole ratio charge of trifluorobromomethane with nitrogen oxide in the presence of mercury and ultraviolet light. Generally, the reaction time is about 24 hours and the pressure is maintained at about one atmosphere by intermittently charging nitrogen oxide to the pressure vessel. Yields are about 60 percent, presumably based on the trifluorobromomethane.

Another process is based on reacting a fluorinated acid anhydride in liquid medium with dinitrogen trioxide to give nitrosyl fluoroacylates or fluoroacylnitrite. Yields in this step are in the range of from 80 percent to 95 percent based on the anhydride. These fluoroacylnitrites such as trifluoroacetylnitrite are then pyrolyzed in an inert medium or in a vapor phase to yield the trifluoronitrosomethane. However, the conversion of the trifluoroacetylnitrite to the trifluoronitrosomethane is fraught with danger in that the nitrite is easily detonatable. For the pyrolysis steps, yields range from about 45 percent to 63 percent, based on the nitrite.

Another method for producing nitroso haloalkanes has been by reacting trifuoroalkyl mercurials with nitrosochloride (nitrosyl chloride). Still another method shown in the art is the photolytically catalyzed reaction of triperfluoroacetic acid anhydride and nitrosyl chloride. Trifluoronitrosomethane may also be prepared by photolytically catalyzed reaction of trifluoroidodomethane with nitric oxide.

Further, U.S. Pat. No. 3,304,335 illustrates the preparation of halodifluoronitrosomethane by using halodifluoroacetic acid salt as a starting material in a suitable liquid medium, thermally decomposing the same, reacting the transitory intermediate difluorocarbene with a nitrosyl halide and recovering the halodifluoronitrosomethane.

It has now been found that perhalonitroso alkanes, and especially perfluoronitroso alkanes such as trifluoronitrosomethane may be prepared in a simpler manner with readily available, relatively less expensive starting materials in nearly quantitative yields. The novel process consists of reacting a haloalkane having a hydrogen atom capable of being replaced with the nitroso radical of nitrosyl chloride to obtain the halonitrosoalkane. The reaction is conducted in the vapor phase under the photolytic influence of ultraviolet radiation.

The starting materials used in the novel process are of the general formula $H(CFX)_n F$ where $X$ is fluorine, chlorine or bromine and $n$ is equal to 1 or greater, i.e., 2,3,4, and 6 or until the molecular weight of the compound is such that it has a vapor pressure at 160° C. either at atmospheric or lower pressures such that the compound is readily vaporizable at the upper temperature.

Some of these starting materials, such as fluoroform, i.e., $CHF_3$, are readily available, as is nitrosyl chloride. The starting materials may be used in mole proportions from 5:1 to 1:1.

Generally, the haloalkane is used in a stoichiometric excess in respect to the nitrosyl chloride. The reaction is generally carried out at atmospheric pressures, or pressures lower than atmospheric. Although for the sake of convenience the reaction is desirably carried out at atmospheric pressure, if the vapor pressure of the particular haloalkane is higher than one atmosphere at temperatures up to 160° C., then the pressure is appropriately reduced allowing the reaction to take place in vapor phase. Thus, a proper combination of temperature and pressure can be readily ascertained for each of the compounds. A mixture or reactants is conveniently contained in an appropriate vessel. Temperatures near 160° C., are preferred because of higher reaction rates.

As the irradiating or photolytic energy source, a mercury arc lamp may be employed. The light of it is filtered to pass wave length between 230 and 400/$\mu$, i.e., within the nitrosyl absorption band. Other light sources are equally applicable such as a 12-inch Hanovia-Cove mercury lamp.

In order to suppress the side reactions, chlorine or air may also be introduced in the reaction vessel.

The product is recovered in a manner well-known in the art such as by distilling at extremely low temperatures, e.g., −84° C. An alternative method for purification of perfluoronitroso methane is to remove water vapor with a drying agent, and the other impurities by absorption, using molecular sieves at temperatures as low as −110° F. The purified trifluoronitrosomethane is then condensed into storage cylinders cooled with liquid nitrogen.

The production of trifluronitrosomethane according to the novel process is very surprising in view of U.S. Pat. No. 2,790,815 in which a pyrolytic reaction is carried out using a fluoroalkane having an available hydrogen radical. In this reaction, the fluoroalkane is reacted with nitrogen dioxide or nitrogen oxide in the presence of chlorine or bromine. The reaction apparently yields only the corresponding perfluoroalkonoyl fluoride. Consequently, it is highly unexpected that the process which has now been discovered results in the production of trifluoronitrosomethane.

The following example will illustrate a specific embodiment of the invention.

EXAMPLE

A mixture of $CHF_3$ (0.496 m. mole, partial pressure 290 torr) and NOCl (0.103 m. mole, partial pressure 60 torr) was irradiated with a 1,000 watt mercury arc lamp, filtered so as to pass wave lengths between 230 m.$\mu$ and 400 m.$\mu$, i.e., NOCl absorption band. The mixture was contained in a quartz cell 10 cm. long at a temperature of 160° C. After 5 hours under these conditions, spectrometric analysis showed that the reaction mixture contained 0.009 m. mole of $CF_3NO$ and a trace of $ClCF_2NO$. The remainder of the mixture consisted of unreacted starting materials. The yield of $CF_3NO$ was nearly quantitative; the conversion based upon NOCl 8.7 percent.

p-octyl phenol, o-nonyl phenol, p-dodecyl phenol, o-dodecyl phenol, 2,6-di-nonyl phenol, 2,4-diethyl phenol, 2,4-di-hexyl phenol, 2,4-dinonyl phenol, 2,4-didodecyl phenol, 2,3,5-triethyl phenol, 2,3,5-trihexyl phenol, 2,3,5-triheptyl phenol, 2,3,4,5-tetrahexyl phenol and other like phenols, as well as the commercially available meta-cresol which contains small amounts of both the para and the ortho isomers; alkoxylated phenols, exemplary of which are m-methoxy phenol, o-methoxy phenol, p-methoxy phenol, m-hexoxy phenol, o-hexoxy phenol, p-hexoxy phenol, 2,4-dimethoxy phenol, 2,4-dihexoxy phenol, 2,3,5-trimethoxy phenol, 2,3,5-trihexoxy phenol, 2,3,4,5-tetrahexoxy phenol and the like; halogenated phenols such as ortho, meta or para bromo phenol; 2,4-dichlorophenol, 2,3,5-trichlorophenol, 3-chloror-4-methyl phenol, 4-bromo-6-ethoxy phenol and the like; styryl phenol, cymyl phenol, $\alpha$-methyl styryl phenol and the like; polyhydric phenols such as pyrocatechol, hydroquinone, resorcinol and the like; alkylated dihydroxy phenols such as 1,3-dihydroxy-4-methylbenzene, 1,2-dihydroxy-4-hexylbenzene and the like; alkoxylated dihydroxy phenols such as 1,4-dihydroxy-3-hexoxybenzene and the like; cycloaliphatic phenols such as p-cyclopentyl phenol, p-cyclohexyl phenol and the like; halogenated dihydroxy phenols such as 1,2-dihydroxy-4-chlorobenzene and the like; trihydric phenols such as phloroglucinol, pyrogallol and the like; polynuclear phenols such as 2,2-bis(p-hydroxyphenyl)-propane and the like.

As a general rule, the phenolated polymers of isoprene contain about 5 to about 75 percent by weight and preferably about 10 to about 40 percent by weight combined phenol based on the total weight of the polymer.

Phenolated polymers of isoprene can be prepared as described in this application and also as described in U.S. Pat. No. 3,177,166, issued Apr. 6, 1965, to J. T. Gregory et al.

Other suitable phenolic tackifiers are the phenol-formaldehyde resins which are generally produced by reacting an alkylated phenol with formaldehyde in the presence of an acid or alkaline catalyst, as for example oxalic acid and sodium hydroxide. Suitable phenols are the alkylated phenols of Formula II wherein $R^1$ preferably has 9 to 25 carbon atoms inclusive. These phenols are further described in U.S. Pat. No. 3,294,866.

Suitable ethylene-propylene polymers for this invention are those which can be cured to elastomeric products. Among such suitable polymers are the copolymers and interpolymers containing at least about 20 percent by weight combined ethylene, preferably about 20 to about 80 percent by weight combined ethylene and at least about 20 percent by weight combined propylene.

Among suitable polymers, as previously stated are copolymers of ethylene-propylene and interpolymers of ethylene-propylene and a polymerizable monomer having at least one olefinic double bond wherein, in each case, the combined ethylene and combined propylene are as defined above.

Illustrative of suitable mono-olefinic compounds are those having the formula:

$$R^2-CH=CH_2$$

wherein $R^2$ is a monovalent hydrocarbon radical generally containing a maximum of 10 carbon atoms and preferably containing a maximum of 8 carbon atoms. Among such monovalent hydrocarbon radicals are the alkyl radicals such as ethyl, propyl, hexyl, 2-ethylhexyl and the like; aromatic radicals such as phenyl, naphthyl and the like; cycloalipatic radicals such as cyclohexyl, n-propyl cyclohexyl and the like.

Methods for preparing copolymers of ethylene-propylene and interpolymers of ethylene-propylene and a mono-olefinic compound are described in detail in U.S. Pat. Nos. 3,000,867 to B. S. Fisher and 2,975,159 to V. Weinmayr, respectively.

Suitable diene monomers which can be used to produce interpolymers and methods for polymerizing these diene monomers with ethylene and propylene are described in U.S. Pat. Nos. 3,000,866 to R. E. Tarney and 3,211,709 to S. Adamek et al.

Especially desirable diene monomers are hexadiene-1,4 dicyclopentadiene, ethylidenebicycloheptene and the like.

In carrying out the present invention, the tackifiers are added to the ethylene-propylene polymers in amounts sufficient to increase the tack thereof. As a rule, this amount is at least about 1 percent by weight tackifier based on the weight of ethylene-propylene polymer, and generally about 8 to about 100 percent by weight. Particularly effective results are achieved using from about 5 to about 20 percent by weight tackifier based on the weight of the ethylene-propylene polymer.

It is to be understood that mixtures of tackifiers and/or mixtures of ethylene-propylene polymers can be used if so desired. The addition of one to the other can be carried out on a two-roll mill, in a Banbury mixer or a twin screw extruder.

Once the compositions are formulated, they are generally formed into sheet form, as for example, on a two-roll mill and subjected to electric discharge, ionizing radiation or nonionizing radiation. The treatment, as described, can be conducted under atmospheric, subatmospheric or superatmospheric pressure generally on the order of about 1 mm. of Hg pressure to about 3 atmospheres pressure. Atmospheric pressure is preferred. Also, with nonionizing radiation it is preferred to conduct the treatment in an atmosphere containing oxygen, for instance air.

Nonionizing radiation can be exemplified by ultraviolet radiation, visible light such as fluorescent light, infrared light, radiation from dielectric heaters and other like radiation. Ionizing radiation can be illustrated by $\beta$-radiation, $\gamma$-radiation, $\alpha$-radiation, X-rays machine generated electrons, as for example, electrons generated by a Vander Graff generator.

The period of time to which each composition is treated, as described, will depend upon the concentration of the tackifier, the exact formulation of the compositions as well as the type of treatment utilized.

To the compositions of this invention can be added pigments, fillers, lubricants, plasticizers, curing agents, accelerators, stabilizers, antioxidants, other rubbers such as styrene-butadiene-1,3 rubbers and the like as is well known in the art. Specific additives are pigments such as carbon black and clay; lubricants such as stearic acid and plasticizers such as naphthenic oils.

In those instances wherein the compositions of this invention contain a polymer of ethylene-propylene which is devoid of olefinic unsaturation for instance, a copolymer of ethylene and propylene, or an interpolymer of ethylene-propylene and a mono-olefinic compound, the compositions can be cured to elastomeric products using an organic peroxide such as dicumyl peroxide. In those instances wherein the polymer of ethylene-propylene contains olefinic unsaturation such as an interpolymer of ethylene-propylene and hexadiene-1,4 the compositions can be cured to elastomeric products using sulfur.

The amount of curing agent, the length of the curing cycle and the temperature thereof will depend, in each instance upon the exact formulation of the compositions, as for example, is described in U.S. Pat. No. 3,200,174 and also as described in this application.

It is to be understood that the disclosure of all patents and literature references are incorporated herein by reference.

In order to demonstrate the excellent "tack" effected by the method of this invention, various compositions were formulated, formed into strips—1 inch by 6 inches by one-eighth of an inch, and treated as described.

The test for tack was carried out by pressing two such strips together using a 2-pound roller and then manually pulling the strips apart. "Tack" was judged on the bases of the difficulty encountered in attempting to manually separate the strips.

The various polymers used in formulating the compositions were prepared as follows:

Preparation of Polymer A—Polyisoprene

Into a 2-liter flask equipped with a stirrer, reflux condenser and dropping funnel, there was distilled 1,000 ml. of tetrahydrofuran which had been dried using lithium aluminum

PROCESS FOR PREPARING NITROSO HALOCARBONS

This invention relates to the preparation of nitroso halocarbons useful as intermediates for the preparation of nitroso polymers.

In particular, this invention relates to the preparation of trihalonitrosomethane, specifically trifluoronitrosomethane, which can be polymerized with other comonomers such as tetrafluoroethylene to form highly inert nitroso polymers. These nitroso polymers are cross-linked to form nitroso rubbers.

In recent years, nitroso rubbers have been a subject of considerable interest, being suitable materials for various applications demanding inertness, or more specifically, oxidation inertness.

Various forms of nitroso rubbers are existent; and in general, these rubbers and the polymer precursor are characterized by very low glass transition temperatures, resistance to solvent and chemical attack and, especially, resistance to aggressive liquid and gaseous oxidizers.

Based on the chemical structure of the polymer, the chemical inertness of it may range up to complete nonflammability in oxygen atmosphere. Hence, nitroso rubbers are especially useful in applications in which the rubber is exposed to a very corrosive atmosphere. Thus, gaskets, seals, O-rings and bladders for liquid oxidizers are but a few of the uses for nitroso rubbers.

Despite these advantageous properties and potential uses, rapid expansion in utilizing the nitroso polymers or rubbers has not taken place for various reasons. One of the problems has been a lack of economically viable processes for producing the necessary intermediates. Another problem has been the lack of economically attractive starting materials for preparing these intermediates. Moreover, the present day processes for preparing these intermediates are based on multistep sequences in which the yields per step decrease, often drastically.

Of the nitrosohaloalkanes used as precursors in forming the nitroso polymers, trifluoronitrosomethane is the most desired and widely utilized intermediate. This intermediate has been prepared by a variety of processes. Although a number of alternative processes are available for obtaining this intermediate, many of these processes are fraught with problems. Thus, a conventional process for preparing trifluoronitrosomethane is by reacting a 50/50 mole ratio charge of trifluorobromomethane with nitrogen oxide in the presence of mercury and ultraviolet light. Generally, the reaction time is about 24 hours and the pressure is maintained at about one atmosphere by intermittently charging nitrogen oxide to the pressure vessel. Yields are about 60 percent, presumably based on the trifluorobromomethane.

Another process is based on reacting a fluorinated acid anhydride in liquid medium with dinitrogen trioxide to give nitrosyl fluoroacylates or fluoroacylnitrite. Yields in this step are in the range of from 80 percent to 95 percent based on the anhydride. These fluoroacylnitrites such as trifluoroacetylnitrite are then pyrolyzed in an inert medium or in a vapor phase to yield the trifluoronitrosomethane. However, the conversion of the trifluoroacetylnitrite to the trifluoronitrosomethane is fraught with danger in that the nitrite is easily detonatable. For the pyrolysis steps, yields range from about 45 percent to 63 percent, based on the nitrite.

Another method for producing nitroso haloalkanes has been by reacting trifluoroalkyl mercurials with nitrosochloride (nitrosyl chloride). Still another method shown in the art is the photolytically catalyzed reaction of triperfluoroacetic acid anhydride and nitrosyl chloride. Trifluoronitrosomethane may also be prepared by photolytically catalyzed reaction of trifluoroiodomethane with nitric oxide.

Further, U.S. Pat. No. 3,304,335 illustrates the preparation of halodifluoronitrosomethane by using halodifluoroacetic acid salt as a starting material in a suitable liquid medium, thermally decomposing the same, reacting the transitory intermediate difluorocarbene with a nitrosyl halide and recovering the halodifluoronitrosomethane.

It has now been found that perhalonitroso alkanes, and especially perfluoronitroso alkanes such as trifluoronitrosomethane may be prepared in a simpler manner with readily available, relatively less expensive starting materials in nearly quantitative yields. The novel process consists of reacting a haloalkane having a hydrogen atom capable of being replaced with the nitroso radical of nitrosyl chloride to obtain the halonitrosoalkane. The reaction is conducted in the vapor phase under the photolytic influence of ultraviolet radiation.

The starting materials used in the novel process are of the general formula $H(CFX)_n F$ where X is fluorine, chlorine or bromine and n is equal to 1 or greater, i.e., 2,3,4, and 6 or until the molecular weight of the compound is such that it has a vapor pressure at 160° C. either at atmospheric or lower pressures such that the compound is readily vaporizable at the upper temperature.

Some of these starting materials, such as fluoroform, i.e., $CHF_3$, are readily available, as is nitrosyl chloride. The starting materials may be used in mole proportions from 5:1 to 1:1.

Generally, the haloalkane is used in a stoichiometric excess in respect to the nitrosyl chloride. The reaction is generally carried out at atmospheric pressures, or pressures lower than atmospheric. Although for the sake of convenience the reaction is desirably carried out at atmospheric pressure, if the vapor pressure of the particular haloalkane is higher than one atmosphere at temperatures up to 160° C., then the pressure is appropriately reduced allowing the reaction to take place in vapor phase. Thus, a proper combination of temperature and pressure can be readily ascertained for each of the compounds. A mixture or reactants is conveniently contained in an appropriate vessel. Temperatures near 160° C., are preferred because of higher reaction rates.

As the irradiating or photolytic energy source, a mercury arc lamp may be employed. The light of it is filtered to pass wave length between 230 and 400/$\mu$, i.e., within the nitrosyl absorption band. Other light sources are equally applicable such as a 12-inch Hanovia-Cove mercury lamp.

In order to suppress the side reactions, chlorine or air may also be introduced in the reaction vessel.

The product is recovered in a manner well-known in the art such as by distilling at extremely low temperatures, e.g., −84° C. An alternative method for purification of perfluoronitroso methane is to remove water vapor with a drying agent, and the other impurities by absorption, using molecular sieves at temperatures as low as −110° F. The purified trifluoronitrosomethane is then condensed into storage cylinders cooled with liquid nitrogen.

The production of trifluronitrosomethane according to the novel process is very surprising in view of U.S. Pat. No. 2,790,815 in which a pyrolytic reaction is carried out using a fluoroalkane having an available hydrogen radical. In this reaction, the fluoroalkane is reacted with nitrogen dioxide or nitrogen oxide in the presence of chlorine or bromine. The reaction apparently yields only the corresponding perfluoroalkonoyl fluoride. Consequently, it is highly unexpected that the process which has now been discovered results in the production of trifluoronitrosomethane.

The following example will illustrate a specific embodiment of the invention.

EXAMPLE

A mixture of $CHF_3$ (0.496 m. mole, partial pressure 290 torr) and NOCl (0.103 m. mole, partial pressure 60 torr) was irradiated with a 1,000 watt mercury arc lamp, filtered so as to pass wave lengths between 230 m.$\mu$ and 400 m.$\mu$, i.e., NOCl absorption band. The mixture was contained in a quartz cell 10 cm. long at a temperature of 160° C. After 5 hours under these conditions, spectrometric analysis showed that the reaction mixture contained 0.009 m. mole of $CF_3NO$ and a trace of $ClCF_2NO$. The remainder of the mixture consisted of unreacted starting materials. The yield of $CF_3NO$ was nearly quantitative; the conversion based upon NOCl 8.7 percent.

Various modifications and alterations of the teachings of the present invention may become obvious to those skilled in the art without departing from the scope thereof. Having illustrated the invention showing the reaction by which trifluoronitrosomethane may be obtained, it will also become apparent that the various combinations of the elements which make up the novel process may be readily varied under appropriate conditions as taught herein. However, the metes and bounds of this invention are best defined by the claims which follow.

What is claimed is:

1. A process for preparing perhalogenated nitroso alkane from a halocarbon compound of the formula

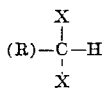

wherein $x$ is fluorine, chlorine or bromine and $R$ is a halogen or a perhalo alkane radical wherein the halogens substituted thereon are fluorine, chlorine, or bromine which comprises reacting said halocarbon with nitrosyl chloride in a vapor phase at a pressure of from one atmosphere or lower and at a temperature from 160° C. and lower while irradiating the reaction mixture with radiant energy at a wavelength between about 230 m.$\mu$ and about 400 m.$\mu$ said halocarbon to nitrosyl chloride ratio on mole basis being from 5:1 to 1:1, and recovering the trifluoronitrosoalkane from the unreacted starting materials and impurities.

2. A process according to claim 1 wherein the halocarbon is fluoroform, and the reaction is carried out at 160° C.

* * * * *

UNITED STATES PATENT OFFICE
CERTIFICATE OF CORRECTION

Patent No. 3,616,359　　　　　　　　Dated October 26, 1971

Inventor(s) John E. Paustian et al.

It is certified that error appears in the above-identified patent and that said Letters Patent are hereby corrected as shown below:

Cancel in the above-identified Letters Patent the first sheet of the specification, columns 1 and 2 of Patent No. 3,616,359 and columns 3 and 4 of Patent No. 3,616,362.

Make the correction in the patent that John E. Paustian's address is in Whippany, New Jersey, and that Herman Burwasser's address is in Vestal, New York.

Signed and sealed this 25th day of July 1972.

(SEAL)
Attest:

EDWARD M. FLETCHER, JR.　　　　　　ROBERT GOTTSCHALK
Attesting Officer　　　　　　　　　　Commissioner of Patents